United States Patent [19]

Dógey

[11] Patent Number: 4,612,914
[45] Date of Patent: Sep. 23, 1986

[54] PORTABLE COLLAPSIBLE SOLAR SURVIVAL APPARATUS

[76] Inventor: Kent A. Dógey, 151 Buckingham Dr., Santa Clara, Calif. 95051

[21] Appl. No.: 607,901

[22] Filed: May 7, 1984

[51] Int. Cl.⁴ ............................................... F24J 2/10
[52] U.S. Cl. ................................... 126/438; 126/451; 350/600
[58] Field of Search ............... 431/438, 451; 350/630, 350/600

[56] References Cited

U.S. PATENT DOCUMENTS

| | | | |
|---|---|---|---|
| 1,424,932 | 8/1922 | Moreau | 126/451 |
| 4,048,983 | 9/1977 | Pei | 126/438 |
| 4,083,357 | 4/1978 | Fisher | 126/451 |
| 4,089,325 | 5/1978 | Brola | 126/438 |
| 4,337,758 | 7/1982 | Meinel et al. | 126/438 |
| 4,422,446 | 12/1983 | Strickland | 126/438 |

Primary Examiner—Carroll B. Dority, Jr.
Attorney, Agent, or Firm—Manfred M. Warren; Robert B. Chickering; Glen R. Grunewald

[57] ABSTRACT

This invention relates to a portable, high performance solar powered oven, distiller, heater and light directing survival apparatus which is fabricated of light weight, flexible materials that can be easily collapsed for convenient mobility.

The invention is formed by concentrating incident solar radiation by means of a funnel shaped reflector into a transparent container which concentrically surrounds a solar heat exchanger. The reflector, transparent container and heat exchanger are constructed in such a way as to permit the heating of food, water, air or desalination reactants to temperatures in excess of 400° F., yet when collapsed, can all fit within the small portable transparent container.

5 Claims, 3 Drawing Figures

PORTABLE COLLAPSIBLE SOLAR SURVIVAL APPARATUS

BRIEF SUMMARY OF DISCLOSURE

In terms of broad inclusion, the solar energy concentrating device of this invention described and illustrated below, utilizes a flexible funnel shaped reflector that directs incident solar radiation through a transparent, sealed container positioned at the major axis of the funnel and enclosing a solar heat exchanger. The transparent container can be opened for disassembly, cleaning, replacement or reconfiguring the solar heat exchanger for heating, cooking, desalination or parallel light transmissions.

It is a primary object of the present invention to provide a portable survival apparatus capable of solar cooking, distilling and parallel light transmissions and having greater versatility and performance at a lower weight and cost than has been possible with any prior art device.

Still another object of this invention provides a transparent container about the solar absorption container which suppresses convection losses and because of its cylindrical shape, it always at or near right angles to the direct and reflected light, permitting maximm transmission and also serving as an ideally shaped condenser in its desalination mode to the evaporate, which will roll down its inner walls while being isolated from its reactants, where it will be collected and removed.

It is another object of the present invention to provide an efficient solar heat exchanger with high recovery rates because the direct and reflected solar energy contacts the solar heat exchanger at or near right angles and other diffuse light and/or poorly concentrated light is multiply reflected into the solar heat exchanger.

Still another object of this invention provides a wick that penetrates the transparent container, bringing saline reactants to the inner absorption wick that surrounds the heat exchanger so that maximum surface area and minimum reactant volumne is realized, yielding maximum evaporate rates while passively moving the reactants into the absorption chamber at a rate equal to the evaporation and subsequent condensation rates.

Still another object of the invention is to provide a passive temperature pressure relief valve on the invention by sizing the condensate outlet port on the transparent container's closure of a small enough diameter so that the surface tension of condensate droplets cover the outlet and thereby seal it until the increasing temperature builds up the pressure, releasing the condensate and thereby controlling the pressure buildup.

Still another object of the invention is to permit direct transfer of the converted thermal energy to the reactants through the total surface area of the heat exchanger thereby maximizing this thermal conversion.

Still another object of the invention makes possible the addition of conventional liquid or air heat exchangers or photovoltaic cells so that water or space heating and/or cooling and electrical generation is a possible option.

Still another object of this invention is to design a proper concentrating geometry that places its focal area close to its base, so that a low center of gravity is maintained, lending greater stability to this portable survival apparatus.

BRIEF DESCRIPTION OF THE DRAWINGS

The objects and features of the invention may be understood with reference to the following description of an illustrative embodiment of the invention taken together with the accompanying drawings in which.

DESCRIPTION OF THE PREFERRED EMBODIMENT

Figure 1:
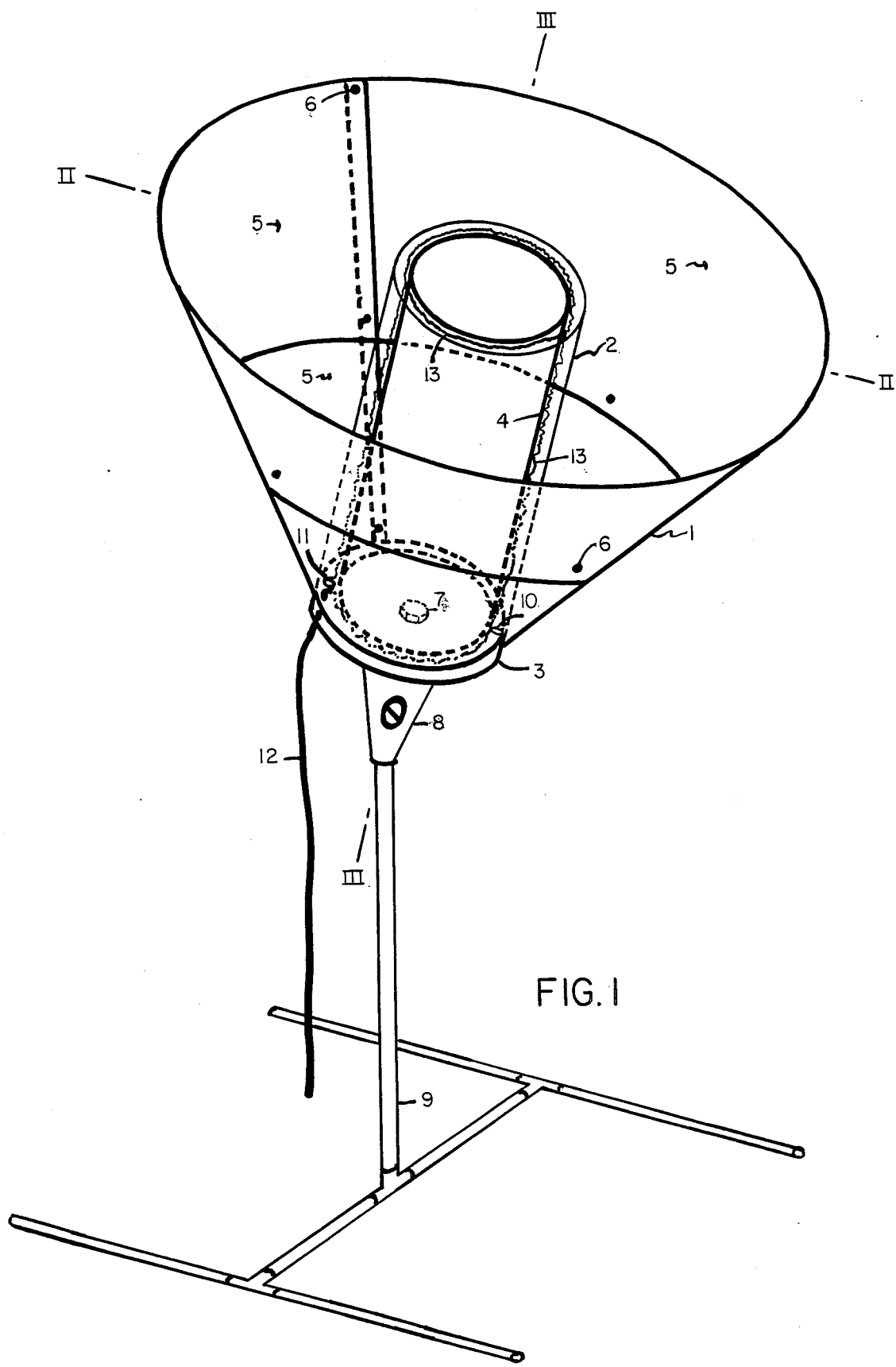
FIG. 1 is a perspective view of the invention in use.
Figure 2:
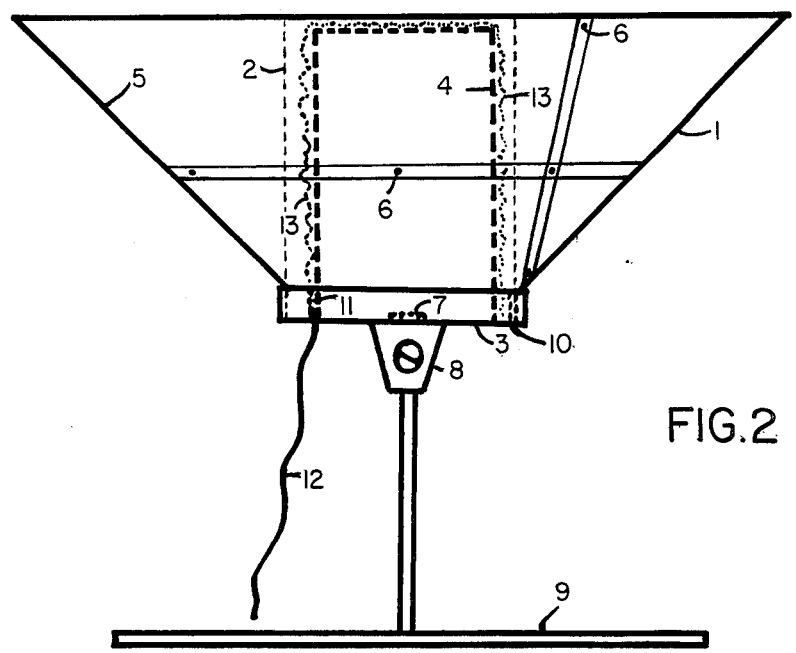
FIG. 2 is a reduced, side elevation view of the apparatus of FIG. 1.
Figure 3:
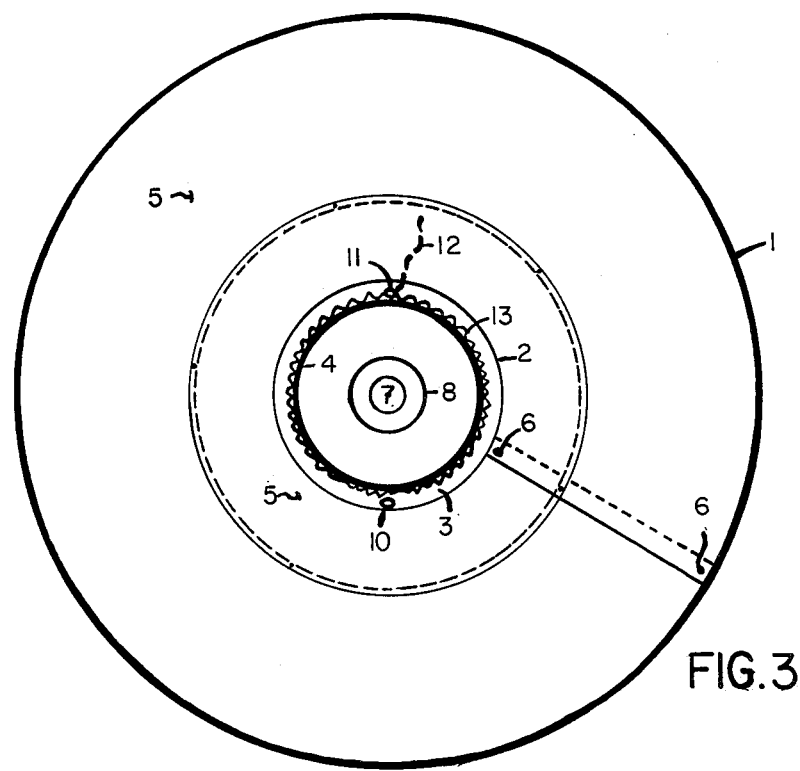
FIG. 3 is a top plan view corresponding to FIG. 2.

Turning now descriptively to the drawings in which similar reference characters denote similar elements throughout the several views, FIGS. 1-3 illustrate the solar survival apparatus 1, which is formed in the shape of a cylindrical, transparent container 2 with a removable, sealable closure 3, and a concentric, inner solar absorbing container 4. The said transparent container and inner absorbing, heat exchanging container lie on the major axis of a surrounding, funnel shaped reflector 5, which is constructed of a flexible, yet semi-ridgid reflective material. Said reflector is held in a fixed position relative to said transparent container by mechanical fasteners 6 which create frictional forces at said reflector's base about the said transparent container's closure and whose other function is to define the geometry of said reflector by connecting sections together by said mechanical fastener means. Said reflector is constructed in sections so when disassembled, will roll up and fit within said containers for greater portability. Said closure will have an optional mechanical fastener 7, which penetrates the center point of said closure, attaching said solar absorbing container to said closure and an exterior mounted two axis swivel 8. Said swivel can be attached to a fixed base 9 for manually or electromechanically directing the major axis of said reflector at the sun for optimum performance.

In the cooking mode, food is placed directly in said solar absorbing, heat exchanging container or in high temperature cooking bags for isolating different food courses. Said transparent container is reattached to said closure and said invention is directed at the sun.

For operating said invention in the desalination mode, said solar absorbing heat exchanger can be filled with saline water and as evaporation temperatures are reached, resulting condensation will roll down the inner walls of said transparent container. This condensate can be removed through a small port 10, on the bottom of said closure, which is physically isolated from the inner reactants of said solar absorbing heat exchanger. By sizing said port to a proper diameter, a passive temperature pressure relief valve is possible due to surface tension of condensate droplets covering said outlet port. As pressure and temperature increases, this condensate will be forced out and and again automatically reseal when future condensates form, permitting the buildup of temperature and pressure.

For a simpler, yet increased desalination output, a second inlet port 11, is placed at the upper side of said closure when tilted as in FIG. 1, where a liquid absorbing wick 12, penetrates and is attached to a liquid and solar absorbing glove 13, which tightly surrounds said solar absorbing heat exchanger. Said glove is physically isolated from said transparent container and said condensate outlet port. Said glove acts as an extension to said wick and permits the passive introduction of saline reactants into said transparent container at a rate proportional to the resulting evaporation. Because the surface area of said glove is greater than that found on the surface of reactants within the solar heat exchanging container used in the first desalination mode described and because the volume to be heated is less than that found within the said heat exchanging container, evaporation rates are much greater.

For directing light transmission outward with a minimum amount of diffusion, said solar absorbing heat exchanger is removed from said transparent container and any conventional light source inserted in line with the major axis of said reflective funnel. All reflective beams will be directed outward parallel to the major axis of said funnel and because of its transparent quality, out through the base of said transparent container.

For water or air heating modes, any heat exchange absorbers currently on the market can be exchanged with said solar absorbing heat exchanger for elevating the temperatures of these transfer mediums.

For generating electricity, photovoltaic cells can be mounted on the exterior of said transparent container and used directly or stored for later use.

Since obvious changes may be made in the specific embodiment of the invention described herein, such modifications being being within the spirit and scope of the invention claimed, it is indicated that all matter contained herein is intended as illustrative and not as limiting in scope.

Having thus described the invention, what I claim as new and desire to secure by Letters Patent of the United States:

1. In a portable collapsible solar energy conversion apparatus including a base, closure means mounted to said base, funnel-shaped reflector means having a small diameter end mounted to said closure means and extending in a deployed condition therefrom to a large diameter end to concentrate solar energy along a central longitudinal axis of said reflector means, a solar energy absorbing structure carried by said closure means and located to extend along said axis, and a transparent container mounted to said closure means concentrically of and surrounding said energy absorbing structure in spaced relation thereto to provide a convection heat transfer barrier, wherein the improvement in said solar conversion apparatus comprises:

said reflector means and said container are each formed for removal from said closure means;

said reflector means being further formed for collapsing to a stored condition dimensioned for storage inside said container with said energy absorbing structure positioned in said container; and securement means formed and mounted for releasable securement of said reflector means in said deployed condition.

2. The solar energy conversion apparatus as defined in claim 1 wherein, said closure means is formed with a port therethrough for discharge of condensate therefrom;

said energy absorbing structure includes a liquid absorbing surface; and a liquid feed means coupled to communicate a liquid to be distilled to said liquid absorbing surface.

3. The solar energy conversion apparatus as defined in claim 2 wherein, said liquid feed means is provided by wick means coupled to said liquid absorbing surface; and at least one of said closure means and said container being formed with a wick receiving port therethrough, said wick means being mounted to extend from said liquid absorbing surface through said port to a source of liquid outside said container.

4. The solar energy conversion apparatus as defined in claim 2 wherein, said port is dimensioned to retain a film of condensate thereacross until a pressure differential between said container and atmosphere is reached which is sufficient to overcome the surface tension of said film whereby said port acts as a passive pressure relief valve.

5. The solar energy conversion apparatus as defined in claim 1 wherein, said reflector means is formed as a thin flexible sheet having opposed end releasably secured together by said securement means, said sheet being dimensioned and being sufficiently flexible to be rolled into said stored condition for storage inside said container.

* * * * *